«12» United States Patent
Ahorner

(10) Patent No.: US 8,104,378 B2
(45) Date of Patent: Jan. 31, 2012

(54) METHOD OF PRODUCING INITIAL COMPONENTS FOR SAW BLADES OR SAW BANDS

(75) Inventor: Leander Ahorner, Waidhofen/Ybbs (AT)

(73) Assignee: Böhler-Uddeholm Precision Strip GmbH, Böhlerwek (AT)

( * ) Notice: Subject to any disclaimer, the term of this patent is extended or adjusted under 35 U.S.C. 154(b) by 569 days.

(21) Appl. No.: 12/300,049

(22) PCT Filed: May 10, 2007

(86) PCT No.: PCT/EP2007/004164
§ 371 (c)(1),
(2), (4) Date: Dec. 19, 2008

(87) PCT Pub. No.: WO2007/128587
PCT Pub. Date: Nov. 15, 2007

(65) Prior Publication Data
US 2009/0114064 A1 May 7, 2009

(30) Foreign Application Priority Data
May 10, 2006 (DE) .......................... 10 2006 021 759

(51) Int. Cl.
*B23D 65/02* (2006.01)
(52) U.S. Cl. ............................................. 76/112
(58) Field of Classification Search ............... 76/112, 76/25.1
See application file for complete search history.

(56) References Cited

U.S. PATENT DOCUMENTS

| 156,964 A * | 11/1874 | Abel et al. ............. 76/112 |
| 907,167 A * | 12/1908 | Neill ..................... 76/112 |
| 2,686,439 A * | 8/1954 | Tobert .................. 76/112 |
| 3,766,808 A * | 10/1973 | Cremisio et al. ..... 76/112 |

FOREIGN PATENT DOCUMENTS

| CA | 2571500 A1 | 1/2006 |
| DE | 202005002831 U1 * | 6/2005 |
| EP | 1616651 A1 | 1/2006 |
| WO | WO2006/005204 A1 | 1/2006 |
| WO | WO 2006005204 A1 * | 1/2006 |

* cited by examiner

*Primary Examiner* — Kenneth E. Peterson
*Assistant Examiner* — Jennifer Swinney
(74) *Attorney, Agent, or Firm* — John D. Titus

(57) ABSTRACT

The present invention relates to a method for manufacturing of preforms (15, 25) for saw blades respectively saw bands, comprising the following steps (a) arranging a strip (30) of a cutting material for a cutting edge of saw blades respectively saw bands without any play between the edges (12, 22) of a first carrier band (10) and a second carrier band (20); (b) guiding of a laser or electron beam (40) along a first edge (32) of the strip (30) for welding part per part of the first carrier band (10) to the strip (30), wherein regions (36) along the first edge (32) of the strip (30) remain unwelded; (c) guiding of a laser or electron beam (40) along a second edge (34) of the strip (30) for welding part per part of the second carrier band (20) to the strip (30), wherein regions (36) along the second edge (34) of the strip (30) remain unwelded; and (d) guiding a laser, water or electron beam (50) between the first edge (32) and the second edge (34) of the strip (30) or the second edge (34) and the first edge (32) of the strip (30) for separating of the strip (30) into segments (31).

18 Claims, 2 Drawing Sheets

METHOD OF PRODUCING INITIAL COMPONENTS FOR SAW BLADES OR SAW BANDS

1. FIELD OF INVENTION

The present invention relates to a method for manufacturing of a preform for producing saw blades respectively saw bands.

2. BACKGROUND OF THE INVENTION

As a preform for manufacturing of saw blades respectively saw bands with hard and wear-resistant regions of the tip of the teeth a composite steel blade or a composite steel band (bimetal band) is generally used. A strip of a cutting material is welded or braised to the edge of a tough, elastic carrier band made of steel.

Since this preform consists of different materials it is also known under the name bimetal band or bimetal blade. Because of the usage of for example tool steel respectively other cutting materials the later regions of the tip of the teeth of the thereof manufactured saw blades respectively saw bands comprise a higher wear resistance and the saw blade or band reaches a higher lift time.

For the manufacturing of the saw blade or band a tooth profile respectively a tooth contour is cut out of the above mentioned bimetal band corresponding to the later saw band or blade. The in this way manufactured tip areas comprise peak areas consisting of tool steel, whereas the rest of the saw blades consist of tough elastic steel of the carrier band. The above described cutting of the cutting contour is related to a high lost of expensive cutting material because the material of the cut space between the teeth is lost.

Therefore in EP 1 616 651 A1 a preform for manufacturing of saw blades or bands is proposed in which a band of a cutting material is welded between the edges of two carrier bands. Thereby two saw blades or bands can be manufactured out of one pre-form respectively, by separating the preform through the segments along the later cutting contour.

The segments of EP 1 616 651 A1 are to be fixed by welding, braising or by other suitable fixing or connecting methods to the carrier bands. The connection of the segments to the carrier bands is carried out by continuous welds or brazing joints along the edges of the segments.

Therefore the present invention has the technical problem to provide a method for manufacturing a preform for saw blades respectively saw bands which can be carried out easily. Furthermore the manufacturing method should guarantee continuously high quality of the preforms. Finally the manufacturing process should be able to be automated to provide a especially cost effective preform.

3. SUMMARY OF THE INVENTION

The technical problems of the present invention are solved by the subject-matter of the independent claim 1. Further configurations of the invention can be found in the dependent claims.

Especially the above mentioned problems are solved through the method for manufacturing of preforms for saw blades respectively saw bands, comprising the following steps:

a. Arranging a strip of a cutting material for a cutting edge of saw blades respectively saw bands between the edges of a first and a second carrier band without any play.

b. Guiding a laser or electron beam along a first edge of the strip for piecewise welding of the first carrier band with the strip, wherein regions along the first edge of the strip remain unwelded;

c. Guiding a laser or electron beam along a second edge of the strip for piecewise welding of the second carrier band with the strip, wherein regions along the second edge of the strip remain unwelded;

d. Guiding a laser, water or electron beam between the first edge and the second edge of the strip or between the second edge and the first edge of the strip for separating of the strip into segments.

Thereby, a method is provided in which two preforms for saw blades or saw bands can be manufactured out of two carrier bands and one strip of cutting material only by alternating laser beam or electron beam welding and laser beam or electron beam separating. Therefore a additional individual separating cut for separating the pre-forms is not necessary.

This method can be processed fully automatically and continuously and needs no manual action. Therefore the method is very cheap and provides additional preforms with a continuously high quality.

The laser or electron beam welding has in comparison with the conventional welding or brazing the advantage that only a very locally limited heat input occurs in the material and therefore a warping is avoided. Furthermore no brazing is necessary and the welding process can be automated.

Because welding and separating is done in the direct neighbourhood, the installation effort is reduced because the clamping and transport devices for the carrier bands and the strips arranged in between have only to be provided once.

Additionally the alternating welding and separating method reduces temperature induced warping because a heat input occurs once and only locally.

Furthermore for the manufacturing of the preforms hardly no waste material is produced because no cutting segments have to be preformed, that means cut or stamped, previously.

Additionally it is only welded and separated in regions where that is necessary for the performs to be manufactured. It is avoided that regions are initially welded and later on separated or cut.

Finally, due to the manufacturing method, the whole width of the strip and the later segments of the cutting edge can be made useful. The important outer edge of the segments is not subjected to heat exposure, except in the region of the separating cut, because it is not welded.

Although the method according to the invention primarily serves for the manufacturing of preforms for saw blades or saw bands it can also be directly a part of the manufacturing process of saw blades or saw bands. Then the claimed method steps are part steps of a overall method for manufacturing of saw blades respectively saw bands without producing preforms as intermediate product.

In a first preferred embodiment the laser, the water or the electron beam is guided for separating in step d. from the end position of the laser or the electron beam of the step b. to the starting position of the laser or electron beam of step c. or from the end position of the laser or the electron beam of step c. to the starting point of the laser or electron beam of the next step b. Thereby a continuous line of welds and separating cuts is generated so that no regions between carrier band and strip are welded, which would have to be separated later on. Therefore the overall length of the welds and separating cuts of a preform is reduced to the necessary minimum amount.

In a further preferred embodiment the step d., related to a specific segment, is performed temporarily before step b. and step c., respectively. Thereby the strip is first cut into single segments which are then welded with a carrier band, respectively.

In an thereto alternatively preferred embodiment the step d. related to a specific segment is performed temporarily after step b. and step c., respectively. Therewith the strip is welded section by section with one carrier band respectively and only then the welded segment is separated from the strip.

Depending on the used materials, the used facility and other items of the thermal warping it can be advantageous to perform the separating of a segment before or after welding the same.

In another preferred embodiment the laser, water or electron beam for separating of the strip is guided perpendicular to the longitudinal direction of the strip.

In an alternative preferred embodiment the laser, water or electron beam for separating of the strip is guided under a certain angle α to the longitudinal direction of the strip.

In a further alternative embodiment the laser, water or electron beam for separating the strip is guided on a banded path.

The separating cut is guided preferably in such way that as less as possible material has to be removed during the later grinding of the shape of the teeth. Thereby separating near the contour is possible which is adapted onto the shape of the later cutting segment. It is further possible to combine perpendicular/inclined separating cuts and separating cuts which are led on a curved path for the manufacturing of two preforms, if it is desirable based on the form of the later cutting segments.

Preferably for the steps b., c. and d. the same laser or the same electron beam cannon is used. For the welding and for the separating the same laser or the same electron beam cannon can be principally used, wherein the laser or the electron beam cannon has to be switched between the operating modes welding and separating by changing of the power or the focus, for example.

Because of the thereby possible continuous laser or electron beams puncture effects, like, for example, burned holes are prevented. Puncture effects arise because a laser or a electron beam cannon has first to overcome start-up oscillations and often generates a too strong energy beam in the beginning which can brand a hole in the material.

Alternatively for the steps b. and c. preferably a first laser or a first electron beam cannon is used and for step d. a second laser or a second electron beam cannon is used. If different lasers or electron beam cannons are used for welding and separating, it must not be switched and it can be separated parallely to the welding. Therefore the beam sources can be adapted and optimised to the respective tasks.

In an embodiment a different effective beam geometry of the laser or electron beam is used for the steps b. and c. than for the step d. One possibility for switching between welding and separating consists of changing the effective beam geometry of the laser or electron beam. Thereby the effective beam geometry is the one with which the beam hits the carrier band or the strip.

A change in the beam geometry can be done, for example by inserting special optics into the beam way. Also, for example, the focus of the beam can be changed so that a narrower respectively more energized beam for separating can be used as for welding.

Preferably the method comprises furthermore the step of separating the configuration of two carrier bands and segments into two separate preforms. After the welding and separating of the strip in two segments the configuration can be separated easily into two parts so that two preforms can be generated. Generally no further working step is necessary for that separating.

Further preferred embodiments result from the sub claims.

4. SHORT DESCRIPTION OF THE ACCOMPANIED DRAWINGS

A description will now be given of embodiments of the present invention with reference to the accompanied drawings. It shows:

FIG. 1 a preferred embodiment of two preforms for saw blades respectively saw bands during the manufacturing method according to the invention;

5. DETAILED DESCRIPTION OF PREFERRED EMBODIMENTS

In the following preferred embodiments of the present invention will be explained in detail with reference to the figures.

Figure 1:
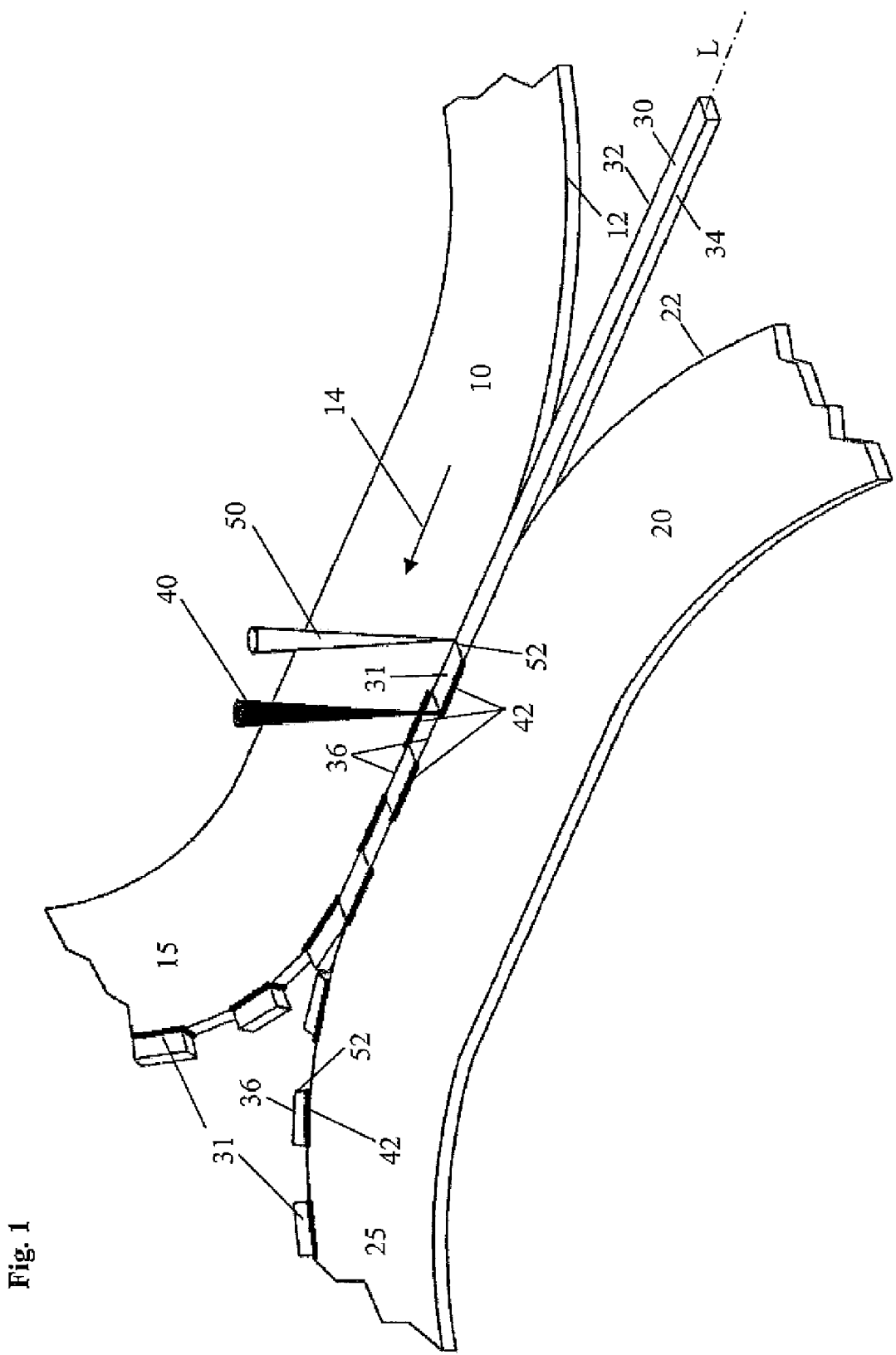

FIG. 1 shows the method for manufacturing of two preforms 15, 25 for saw blades respectively saw bands.

First of all a strip 30 of a cutting material for a cutting edge of saw blades respectively saw bands is arranged between the edge 12 of a first carrier band 10 and the edge 22 of a second carrier band 20. The carrier bands 10, 20 respectively the strip 30 comprise preferably a rectangle cross section.

The arrangement of the carrier bands 10, 20 and strips 30 clamped in between will be moved under the cutting respectively welding facility as indicated by the arrow 14, which on the one side cuts the strips 30 in segments 31 and welds these segments 31 or parts of the strip 30 to the carrier bands 10, 20, respectively.

For cutting and also for welding the laser beams 40, 50 are preferably used. The laser beams 40, 50 can be used under usual environmental conditions. Thereby the material which was melted through the separating cut of the laser beam 40, 50 can be blown out by compressed air. It is therefore preferred both for welding and for separating only to use the laser beams 40, 50.

If electron beams 40, 50 are used for welding or separating this is usually done in vacuum. Therefore it can be necessary to provide especially sealed chambers around the electron beam 40, 50. Preferably the electron beam 40, 50 is only used for welding because in vacuum the melted material cannot be blown out.

For separating the strip 30 into segments 31 also a high pressure water beam can be used which may also contain abrasive particles to increase its cutting power.

It is preferred that the laser, water or electron beams 40, 50 are moved only perpendicular to the movement direction 14 of the carrier bands 10, 20 and of the strip 30. It is also possible that the laser, water or electron beams 40, 50 can also be moved in direction 14, that means free in movement in the x-y plane.

As shown in FIG. 1 the laser, water or electron beam 50 separates the strip 30 along a separating cut 52 into equal segments 31. During this process the segments 31 are clamped between the carrier bands 10, 20 and do not change their position relative to the carrier bands 10, 20.

When a laser or electron beam 40 is used for welding it comprises a different beam geometry and/or a different beam power and/or a different focus than the laser or electron beam 50 for separating and welds the separated segments 31 respectively alternately with the carrier band 10 or the carrier band 20 along one weld 42, respectively. If a segment 31 is to be welded with a first carrier band 10 the weld 42 goes along the edge 32 of the strip 30 respectively along the formerly separated segment 31. If the segment 31 however is to be welded with the carrier band 20 the weld 42 goes along the edge 34 of the strip 30 respectively the separated segment 31.

The regions 36 along the first edge 32 or second edge 34 of the strip 30 respectively the segments 31, which lay opposite to the welds 42, remain unwelded. Because of the arrangement according to the present invention of separating cut 52, welds 42 and unwelded regions 36 the arrangement of the two carrier bands 10, 20 and the segments 31 can be separated into two separate preforms 15, 25 later on easily as it is shown symbolically in the left portion of FIG. 1.

Thereby the segments 31 are safely joint with the respective carriers band 10, 20, wherein the regions 36 which form later on the actual cutting edge of the saw blades or saw bands are basically not subject to heat exposure. Therefore there is no change in the microstructure especially no embrittlement or no grain grove.

With reference to the FIG. 1 and FIG. 2 a preferred manufacturing method proceeds as follows:

Initially the strip 30 is arranged between the edges 12, 22 of the carrier bands 10, 20 without any play by pressing the carrier bands 10 and 20 from outside into the direction of the strip 30.

Then the laser, water or electron beam 50 is guided between the first edge 32 or the second edge 34 of the strip or in the other direction of the second edge 34 or the first edge 32 of the strip in order to perform a separating cut 52 and to separate the strip 30 into single segments 31.

Then the laser or electron beam 40 is guided along the first edge 32 of the strip 30 for welding the strip 30 partly with the carrier band 10. Thereby the opposite region 36 along the edge 34 of the strip 30 remains unwelded.

After that a separating cut 52 is preferable performed by the laser, water or electron beam 50 which is guided between the second edge 34 and the first edge 32 of the strip 30.

Then this newly separated segment 31 is welded with the carrier band 20 by guiding the laser or electron beam 40 along the second edge 34 of the strip 30 a distance in order to form a weld 42. The opposite portion 36 along the first edge 32 of the segment 31 thereby remains unwelded.

After that the method is continued by once more guiding a separating cut 52 and welding the separate segment with the first carrier band 10.

In an alternative embodiment sections of the strip 30 can be alternately welded with the carrier band 10 or the carrier band 20 respectively, wherein the separating cuts 52 are performed only after the welding. There the strip 30 remains exactly positioned during welding.

As shown in FIG. 1 two different laser or electron beams 40, 50 can be used for the welding and for the separating which are either produced through the same laser or the same electron beam cannon or through a own laser or electron beam cannon, respectively. Preferably a different effective beam geometry of the laser or electron beam is used for welding than for the separating cut 52. The effective beam geometry is hereby the beam geometry that hits the material respectively penetrates in the material. It can be changed by, for example, varying the focus of the laser or electron beam 40, 50 by means of an optics.

Figure 2:
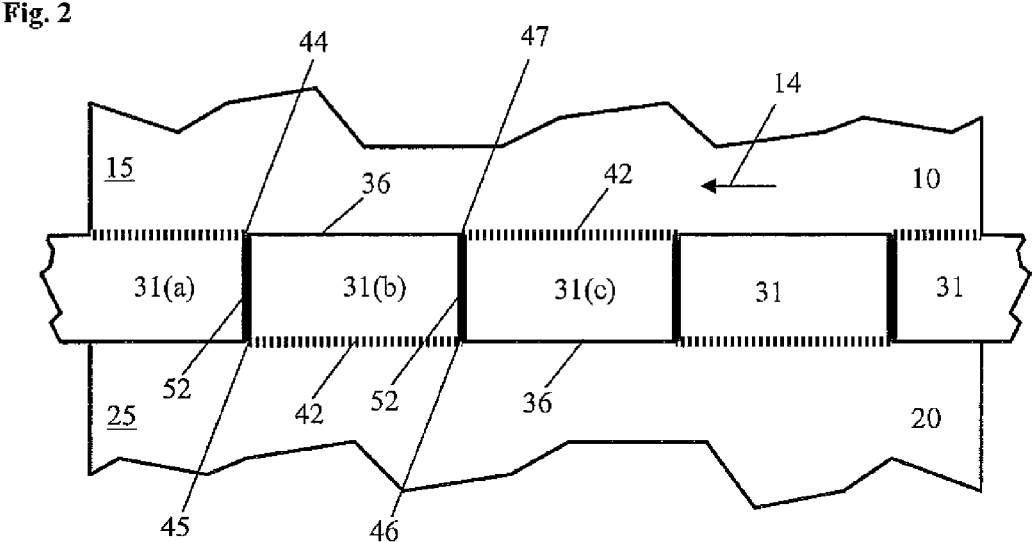
FIG. 2 is a detailed view of a preferred embodiment of preforms.

FIG. 2 shows a section of two preforms 15, 25 according to the manufacturing method of the present invention but before the two preforms 15, 25 are separated from each other.

In FIG. 2 the segments, as denoted in FIG. 1, have an essentially rectangular shape and are connected to the welds 42 respectively to the carrier bands 10, 20. The segment 31(a) and the segment 31(c) are welded with the carrier band 10 for example and the segment 31(b) is welded with the carrier band 20. The segments 31 are therefore welded with the carrier band 10 or the carrier band 20 alternately.

As indicated through the separating cuts 52, the strip 30 is separated into equally large segments 31. However, it is basically possible to arrange the separating cuts 52 arbitrarily and therefore generating differently wide segments 31. Because the separating cuts 52 are performed by laser or electron beams 50, which are preferably guided computer controlled, a change in the widths or in the shape of the segments 31 can be realizable easily.

As shown in FIG. 2 the separating cut 52 on the one hand runs between the end position 44 of the laser or electron beam 40 of the weld 42 of the segments 31(a) and the starting position 45 of the weld 42 of the segment 31(b). The next separating cut 52 between the segment 31(b) and the segment 31(c) runs between the end position 46 of the weld 42 of the segment 31(b) and the starting position 47 of the weld 42 of the next segment 31(c).

Thereby the separating of the strip 30 into segments 31 can happen before the respective segment 31 is welded onto the respective carrier band 10, 20 by the laser or electron beam 40 or only after that.

Figure 3:
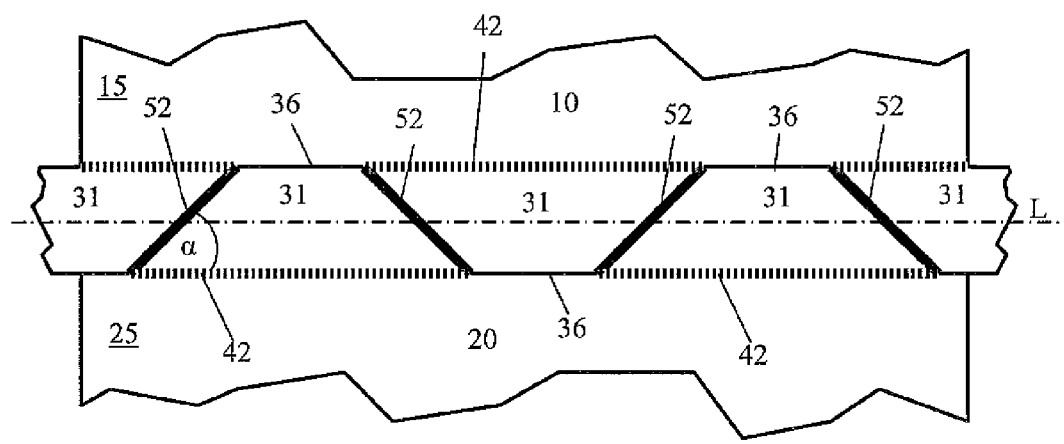
FIG. 3 is a detailed view a another preferred embodiment of two preforms.
Figure 4:
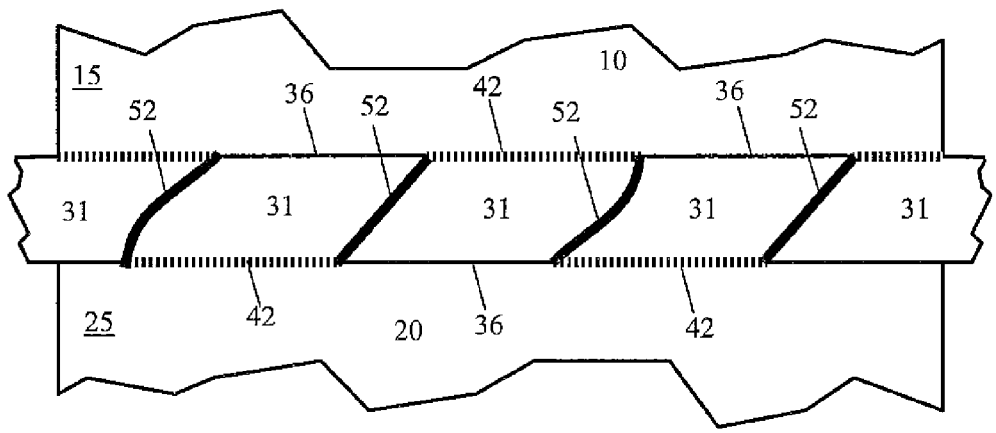
FIG. 4 is a detailed view of a another preferred embodiment of two preforms.

FIG. 3 shows a trapezoid shape of the segments 31, which is generated by guiding the laser beam 50 for separating the strip 30 in an angle α to the longitudinal direction L of the strip 30. This has the advantage that the shape of the segments 31 can be adapted better to the later edge shape of the saw blades respectively saw bands. Since, that the laser respectively electron beam is guided computer controlled, arbitrary shapes of segments can therefore be generated, as in FIG. 4 denoted through the separating cuts 52, which can be arbitrarily curved, for example. For this purpose the laser or electron beam 50 for separating of the strip is guided on a curved path. FIG. 4 also shows that the separating cuts 52 between the segments 31 can also follow certain patterns in order to perform the separating cuts 52 as close as possible to the contour.

The thickness of the (preferably rolled manufactured) carrier bands 10, 20 lies in the range of ca. 0.5 till 3 mm. The width of the carrier bands 10, 20 is also chosen that it is larger or approximately equal to the width of the later saw blades respectively saw bands.

The thickness of the strip 30 and therefore the segments 31 can also lie in the range of 0.5 till 3 mm, wherein its thickness can also be larger as those of the carrier band 10, because hence saw blades or saw bands can be manufactured which comprise a broader point region for a free cut as the carrier band region.

The strip 30 can consist of a drawn and/or rolled HSS-wire. Additional preferred materials for the strip 30 are hard metals or cermets, that means materials consisting of ceramic and metallic phases. Additionally also all other cutting materials for manufacturing of the segments 30 are suitable, which can be durably connected with the carrier bands 10, 20 by welding.

LIST OF REFERENCE SIGNS 10 first carrier band
12 edge
14 movement direction of the carrier band/strip configuration
15 preform
20 second carrier band
22 edge
25 preform
30 strip
31 segments
32 first edge
34 second edge
36 unwelded regions
40 laser or electron beam
42 weld
44 end position
45 starting position
46 end position
47 starting position
50 laser, water or electron beam
52 separating cut

The invention claimed is:

1. A method of manufacturing preforms for saw blades, comprising:
   a. Arranging a continuous strip of cutting material between the edges of a first carrier band and a second carrier band;
   b. guiding a welding beam along a first edge of the strip for welding intermittently the first carrier band to the strip to form a plurality of first welds, wherein regions along the first edge of the strip remain unwelded;
   c. guiding a welding beam along a second edge of the strip for welding intermittently the second carrier band to the strip to form a plurality of second welds, wherein regions along the second edge of the strip remain unwelded; and
   d. guiding a cutting beam between the first edge and the second edge of the strip, the cutting beam intersecting the unwelded regions, whereby the strip is separated into a plurality of segments attached alternatingly to the first carrier and the second carrier.

2. The method of claim 1, wherein:
the welding beam comprises a laser or electron beam.

3. The method of claim 1, wherein:
the cutting beam comprises a laser, electron beam or water jet.

4. The method of claim 1, wherein:
the cutting beam is guided in a direction perpendicular to a longitudinal axis of the strip, whereby the segments are substantially rectangular in shape.

5. The method of claim 1, wherein:
the cutting beam is guided in an angular direction relative to a longitudinal axis of the strip, whereby the segments are substantially trapezoidal in shape.

6. The method of claim 1, wherein:
the cutting beam is guided in a curved path relative to the strip.

7. The method of claim 1, wherein:
the welding beam and the cutting beam comprise the same instrument.

8. The method of claim 1, wherein:
the unwelded regions along the first edge of the strip are staggered longitudinally relative to the unwelded regions along the second edge of the strip.

9. The method of claim 1, wherein:
each weld has a start and a finish, wherein the cutting beam is guided from a point adjacent the finish of a weld along the first edge of the strip to a point adjacent the start of a weld along the second edge of the strip.

10. The method of claim 1, wherein:
the welding and cutting steps are performed simultaneously.

11. The method of claim 1, wherein:
the welding and cutting steps are repeated sequentially with respect to each one of the plurality of segments.

12. The method of claim 11, wherein:
the step of welding the first edge of the strip to the first carrier is performed first with respect to the segment, and the step of guiding the cutting beam is performed second with respect to the segment.

13. The method of claim 11, wherein:
the step of guiding the cutting beam is performed first with respect to the segment; and the step of welding the first edge of the strip to the first carrier is performed second with respect to the segment.

14. A method of manufacturing preforms for saw blades, comprising:
   a. Arranging continuous strip of cutting material having first and second edges between the edges of a first carrier band and a second carrier band;
   b. guiding a welding beam along a portion of the first edge of the strip to form a first weld between the first carrier band and the strip, the first weld terminating at a first unwelded region between the first edge of the strip and the first carrier band;
   c. guiding a welding beam along a portion of the second edge of the strip to form a second weld between the second carrier band and the strip, the second weld being staggered longitudinally relative to the first weld, the second weld terminating at a second unwelded region between the second edge of the strip and the second carrier band; and
   d. guiding a cutting beam between the first edge and the second edge of the strip, the cutting beam intersecting the first unwelded region and the second unwelded region, whereby the strip is separated into adjacent segments attached one each to the first carrier and the second carrier.

15. The method of claim 14, wherein:
the steps of forming the first weld and the second weld are repeated to form a plurality of welded and unwelded regions.

16. The method of claim 14, wherein,
the step of guiding the cutting beam is performed before the steps of guiding the welding beam to form the first weld and the second weld.

17. The method of claim 14, wherein,
the step of guiding the cutting beam is performed after the step of guiding the welding beam to form the first weld and before the step of guiding the welding beam to form the second weld.

18. The method of claim 14, wherein,
the step of guiding the cutting beam is performed after the step of guiding the welding beam to form the first weld and after the step of guiding the welding beam to form the second weld.

* * * * *